US011892981B2

(12) United States Patent
 Murphy et al.

(10) Patent No.: US 11,892,981 B2
(45) Date of Patent: *Feb. 6, 2024

(54) ON DEMAND FILE SYNC

(71) Applicant: AirWatch LLC, Atlanta, GA (US)

(72) Inventors: Gerard Murphy, Lawrenceville, GA (US); Daniel James Beveridge, Apollo Beach, FL (US); Blake Watts, St. George, UT (US); Nicholas Grivas, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 469 days.

This patent is subject to a terminal disclaimer.

(21) Appl. No.: 16/869,643

(22) Filed: May 8, 2020

(65) Prior Publication Data

US 2020/0265019 A1 Aug. 20, 2020

Related U.S. Application Data

(63) Continuation-in-part of application No. 15/080,293, filed on Mar. 24, 2016, now Pat. No. 10,678,750.

(60) Provisional application No. 62/211,348, filed on Aug. 28, 2015.

(51) Int. Cl.
  *G06F 16/00* (2019.01)
  *G06F 16/178* (2019.01)
  *G06F 16/16* (2019.01)

(52) U.S. Cl.
  CPC .......... *G06F 16/178* (2019.01); *G06F 16/162* (2019.01)

(58) Field of Classification Search
  CPC .. G06F 16/125; G06F 16/162; G06F 16/1844; G06F 16/178; G06F 16/1734

USPC .......................................................... 707/632
See application file for complete search history.

(56) References Cited

U.S. PATENT DOCUMENTS

| 8,819,194 | B2* | 8/2014 | Visalli | H04L 67/01 |
| | | | | 717/172 |
| 9,053,124 | B1 | 6/2015 | Dornquast et al. | |
| 2006/0168492 | A1* | 7/2006 | Haselden | G06F 8/61 |
| | | | | 714/746 |
| 2011/0010761 | A1* | 1/2011 | Doyle | G06F 21/6218 |
| | | | | 726/5 |
| 2012/0109915 | A1 | 5/2012 | Kamekawa | |

(Continued)

FOREIGN PATENT DOCUMENTS

WO WO-2013073220 A1 * 5/2013 ............. G06Q 30/06

OTHER PUBLICATIONS

Yamaguchi et al., machine translation of WO 2013/073220, published date of May 23, 2013. 12 pages,.*

*Primary Examiner* — Monica M Pyo
(74) *Attorney, Agent, or Firm* — King Intellectual Asset Management (57) ABSTRACT

Disclosed are various examples for downloading data objects by enforcing a threshold amount of allocated data. In one example, among others, an application downloads a first subset of the files from a remote file management system. A user interface displays file system entries that represent the first subset of downloaded files and a second subset of undownloaded files from the remote file management system. The application detects an event for a respective file system entry associated with a respective file from the second subset of undownloaded files. The respective file is downloaded from the remote management system.

20 Claims, 4 Drawing Sheets (56) References Cited

U.S. PATENT DOCUMENTS

| | | | |
|---|---|---|---|
| 2012/0255004 A1* | 10/2012 | Sallam | G06F 21/554 |
| | | | 726/23 |
| 2013/0254699 A1 | 9/2013 | Bashir et al. | |
| 2013/0297887 A1* | 11/2013 | Woodward | G06F 16/183 |
| | | | 711/137 |
| 2014/0143504 A1 | 5/2014 | Beveridge | |
| 2014/0173196 A1 | 6/2014 | Beveridge et al. | |
| 2014/0181959 A1* | 6/2014 | Li | G06F 21/32 |
| | | | 726/19 |
| 2015/0143227 A1 | 5/2015 | Jia et al. | |
| 2016/0070431 A1 | 3/2016 | Caporal et al. | |
| 2016/0364575 A1 | 12/2016 | Caporal et al. | |
| 2017/0064549 A1* | 3/2017 | Rykowski | H04L 67/34 |

* cited by examiner

ON DEMAND FILE SYNC

CROSS-REFERENCE TO RELATED APPLICATIONS

This application is a continuation application that claims priority to U.S. application Ser. No. 15/080,293, titled "ON DEMAND FILE SYNC," filed on Mar. 24, 2016, which claims priority to U.S. Application Ser. No. 62/211,348 titled "ON DEMAND FILE SYNC," filed Aug. 28, 2015, which are incorporated herein by reference in their entireties.

BACKGROUND

File management systems can allow a user to perform various operations with respect to remotely stored files. For example, a user can upload a file for storage, download stored files, or edit files. This allows for remote access to files independent of the client device assessing the file management system.

A client device can have an amount of disk space or memory allocated for storing local copies of data stored by the file management system. If this amount of disk space is less than the total amount of data accessible to the client device, files must be selectively downloaded and removed in order to prevent storing data in excess of the total allocated space. This can require a user to designate which files should be stored locally and, if necessary, which files should be deleted from local storage.

Additionally, access to a file management system can be facilitated by a dedicated application executed on the client. Although this dedicated application allows a user of the client to access and modify the remotely stored files, it requires a user to use another application in addition to applications native to the client device's operating system used for browsing a local file system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

File management systems allow users of client devices to perform various operations with respect to remotely stored files. For example, the file management system can allow the upload or download of files between a client device and the file management system. The file management system can also allow a client device to read files or write changes to files. These read or written files can include remotely stored instances stored by the file management system or locally stored instances of files that can be uploaded or synced with the file management system. Additionally, the file management system can maintain user accounts defining permissions, requirements, or other attributes with respect to files.

A client device can have a limited amount of disk space or memory allocated for storing local copies of data stored by the file management system. If this amount of disk space is less than the total amount of data accessible to the client device, the client device is restricted to storing a subset of the accessible data on the client device. A file sync application determines which files in a remotely stored file system should be downloaded to the client device such that the total amount of downloaded files meets or falls below a threshold amount of allocated disk space. This can include applying one or more rules, ranking algorithms, or caching algorithms to select the files to be downloaded.

For those files not downloaded to the client device, the file sync application maintains an entry in a local file system but without downloading a corresponding data object. The file sync application attaches event handlers to these file system entries to intercept any calls or other actions to be applied to the undownloaded file. By creating the entries in the local file system for the undownloaded files, a client application used to browse the local file system will depict representations of these undownloaded files, thereby eliminating the requirement for a dedicated application to access the remotely stored file system, and allowing for seamless browsing between locally stored and remotely stored files. The inclusion of representations of undownloaded files when browsing the local file system can be referred to as "ghosting" the undownloaded files.

If a user or an application requires that a file be downloaded to the client device, the file sync application can also select one or more other files for deletion from the client device so that, after downloading the required file, the amount of stored files from the remotely stored file system falls below the threshold.

In the following discussion, a general description of the system and its components is provided, followed by a discussion of the operation of the same.

Figure 1:
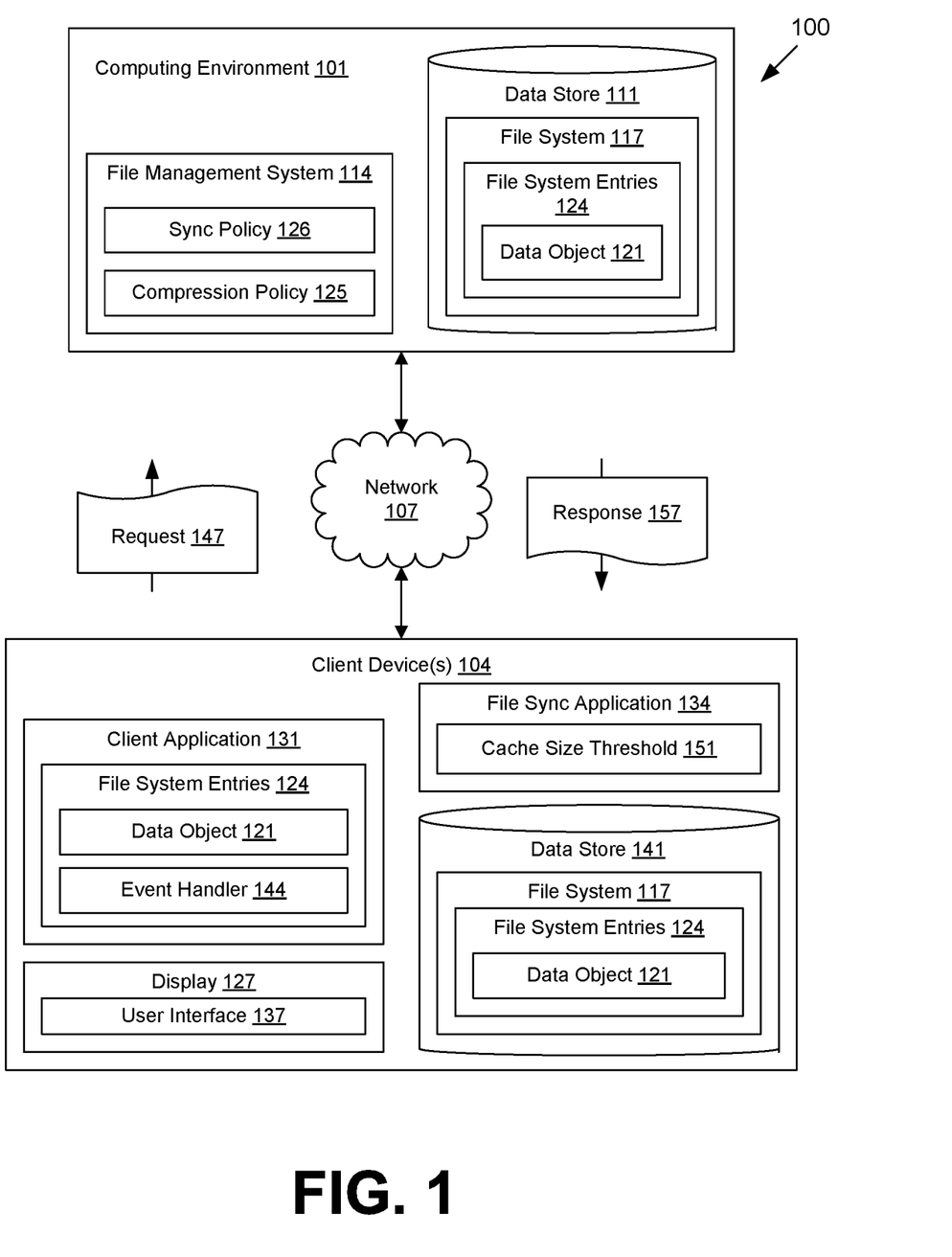
FIG. 1 is a drawing of a networked environment according to various examples.

With reference to FIG. 1, shown is a networked environment 100 according to various examples. The networked environment 100 includes a computing environment 101, and a client device 104, which are in data communication with each other over a network 107. The network 107 includes, for example, the Internet, intranets, extranets, wide area networks (WANs), local area networks (LANs), wired networks, wireless networks, or other suitable networks, or any combination of two or more such networks. For example, such networks can include satellite networks, cable networks, Ethernet networks, and other types of networks.

The computing environment 101 can include, for example, a server computer or any other system providing computing capabilities. Alternatively, the computing environment 101 can employ multiple computing devices that can be arranged, for example, in one or more server banks, computer banks, or other arrangements. The computing devices can be located in a single installation or can be distributed among many different geographical locations. For example, the computing environment 101 can include multiple computing devices that together form a hosted computing resource, a grid computing resource, or any other distributed computing arrangement. In some cases, the computing environment 101 can operate as at least a portion of an elastic computing resource where the allotted capacity of processing, network, storage, or other computing-related resources can vary over time. The computing environment 101 can also include or be operated as one or more virtualized computer instances. Generally, the computing environment 101 can be operated in accordance with particular security protocols such that it is considered a trusted computing environment. The data store 111 can be representative of a single data store 111, or a plurality of data stores 111 as can be appreciated.

The components executed on the computing environment 101, for example, include a file management system 114, and other applications, services, processes, systems, engines, or functionality. The file management system 114 can facilitate the access to and potentially the modification of a file system 117 by client devices 104. To this end, the file management system 114 can obtain data objects 121 from client devices 104 through the network 107 or from other sources for storage in the data store 111, thereby creating a file system entry 124 for the corresponding data object 121. The file management system 114 can also communicate data objects 121 to client devices 104 through the network 107. The file management system 114 can also track versions, updates, or modifications to file system entries 124 or data objects 121. To this end, the file management system 114 can include one or more version management or version control systems.

The file management system 114 can also enforce a compression policy 125 defining rules indicating data objects 121 that can be compressed or otherwise transformed when communicated to a client device 104 for storage. For example, the compression policy 125 can indicate that data objects 121 of a particular file type, such as text, videos, or images, files of a particular encoding scheme, or files having a particular file extension should be compressed when stored by the client device 104. The compression policy 125 can also indicate that data objects 121 matching one or more rules should be compressed. The rules can select data objects 121 for compression based on a frequency of use, recency of use, size, or other attribute.

The file management system 114 can also enforce a sync policy 126 defining what data objects 121 should be communicated to client devices 104, as well as enforcing restrictions on the transfer of data objects 121. For example, the sync policy 126 can define one or more rules or algorithms for selecting data objects 121 for download, as will be discussed below. The sync policy 126 can also define thresholds for the transfer of data objects 121 to client devices 104. Such thresholds can limit an amount of network 107 bandwidth allocated to the communication of data objects 121, a maximum number of data objects 121 downloadable per client device 104 or within a time window.

The data stored in the data store 111 includes, for example, a file system 117 having one or more file system entries 124. A file system 117 defines the storage and access of system entries 124 and corresponding data objects 121 by the file management system 114. Data objects 121 include instances of data accessed or modified by the file management system 114. To this end, data objects 121 can include documents, media, executable applications, or other data. File system entries 124 can include file names, memory addresses, identifiers, or other data associated with a corresponding data object 121. File system entries 124 can also describe attributes of a data object 121, including a data size, encoding or compression scheme, permissions, or other attributes. File system entries 124 can also include directory structures such as folders or directories encoding a hierarchy, grouping or relationship of other file system entries 124.

The client device 104 is representative of a plurality of client devices that can be coupled to the network 107. The client device 104 can include, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 104 can include a display 127. The display 127 can include, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client device 104 can be configured to execute various applications such as a client application 131, a file sync application 134, and/or other applications. The client application 131 can be executed in a client device 104, for example, to access network content served up by the computing environment 101 and/or other servers, thereby rendering a user interface 137 on the display 127. The client application 131 can also be used to browse one or more locally or remotely stored file system entries 124. To this end, the client application 131 can include, for example, a browser, or a dedicated application, and the user interface 137 can include a network page, or an application screen.

The file sync application 134 is executed to download file system entries 124 stored in the computing environment 101 for storage in the client device 104. This can include creating instances of file system entries 124 in a file system 117 locally stored in a data store 141 of the client device 104. Thus, the file system entries 124 stored in the client device 104 correspond to file system entries 124 in the computing environment 101. The file sync application 134 can also modify file system entries 124 or data objects 121 stored in the computing environment to reflect changes to the corresponding file system entry 124 or data object 121 stored on the client device 104. The file sync application 134 can also upload data objects 121 and create new file system entries 124 for the computing environment 101 to reflect file system entries 124 and data objects 121 newly created in the client device 104. The file sync application 134 can also attach event handlers 144 to file system entries 124 for which the corresponding data object 121 is not downloaded by the file management system 114, as will be discussed in further detail below. The client device 104 can be configured to execute applications beyond the client application 131 and file sync application 134 such as email applications, social networking applications, word processors, spreadsheets, and/or other applications.

Next, a general description of the operation of the various components of the networked environment 100 is provided. To begin, a file sync application 134 executed in the client device 104 accesses the file management system 114. In some examples, accessing the file management system 114 can initiate a sync operation between this client device 104 and the file management system 114. This can include the file sync application 134 generating a request 147 to download one or more file system entries 124 and/or one or more data objects 121 accessible to the client device 104.

The file management system 114 or the file sync application 134 can enforce a cache size threshold 151 defining a maximum amount of memory or disk space allocated for data objects 121 downloaded from the file management system 114. The cache size threshold 151 can be configured using the file management system 114 and defined with respect to multiple client devices 104. Alternatively, the sync application 134 can determine total available space on a client device 104 and allocate at least a portion of it as the cache size threshold 151 for storage by the file sync application 134. The cache size threshold 151 can be defined on a per-client device 104 basis. In these examples, the file sync application 134 can determine which data objects 121 should be downloaded by applying one or rules, one or more caching algorithms, or other approaches as defined in a sync policy 126. For example, the file sync application 134 can rank data objects 121 that can be downloaded according to a frequency of access, a recency of access, a recency of creation, a recency of storage, or other criteria. The file sync application 134 then selects according to the ranking a number of data objects 121 such that, after downloading, the total size of data objects 121 associated with the file management system 114 meets or falls below the cache size threshold 151. The data objects 121 can also be selected according to the size of the accessible data objects 121 in order to minimize an amount of free space allocated by the cache size threshold 151. Additionally, the file sync application 134 can prompt a user to select data objects 121 for sync. The file sync application 134 can also prompt the user to define preferences or criteria of the sync policy 126, such as a preference to use allocated space for as many data objects 121 as possible, or a preference for downloading algorithmically determined data objects 121. The file sync application 134 then indicates the selected data objects 121 in the request 147.

The file management system 114 communicates the data objects 121 indicated in the request 147 to the client device 104 in a response 157. If the file system entries 124 corresponding to the data objects 121 are not stored in the client device 104 or require updating, the file management system 114 can also communicate these file system entries 124 to the client device 104. Additionally, the file management system 114 can communicate file system entries 124 for data objects 121 accessible to the client device 104 without communicating the corresponding data objects 121. This allows the client device 104 to receive the file system entries 124 for those data objects 121 that were not selected for download.

The file sync application 134 then stores the received file system entries 124 and data objects 121 in the file system 117 of the data store 141. The file sync application 134 can attach an event handler 144 to those file system entries 124 for which a data object 121 is not stored in the data store 141. The event handler 144, when triggered by an access of the corresponding file system entry 124, notifies the file sync application 134 of the access, as will be described in further detail below. Attaching the event handler 144 can include issuing an input output control (ioctl) to the file system 117 of the client device 104 indicating a file system entry 124 to which the event handler 144 will be attached.

As the file sync application 134 inserts the file system entries 124 downloaded from the file management system 114 into a file system 117 local to the client device 104, file system entries 124 associated with the file management system 114, including those for which a data object 121 is not stored in the client device 104, i.e. "ghosted files," can be browsed seamlessly with other locally stored file system entries 124. For example, a client application 131 functioning as an operating system-native file system 117 browser can be used to browse the file system entries 124 from the file management system 114. Examples of browsers of operating system-native file system 117 browsers can include Windows Explorer™, Finder™, or other browsers. In some examples, a user interface 137 of the client application 131 can distinguish file system entries 124 associated with the file management system 114 from other local file system entries 124 by applying a graphical overlay or other element to the respective file system entry 124 icons. The graphical overlays applied to icons for file system entries 124 of the file management system 114 can further indicate whether a corresponding data object 121 is stored in the client device 104. For example, an icon corresponding to an undownloaded data object may be grayed out, or have a transparency or other effect applied to the icon. As another example, the icon may have a graphical element or "badge" overlay to distinguish the icon, such as a downward facing arrow indicating the data object 121 must be downloaded.

As was discussed above, file system entries 124 for which a data object 121 has not been downloaded can have an event handler 144 attached by the file sync application 134. When an application or service executed in the client device 104 attempts to open or otherwise access these file system entries 124, the event handler 144 prevents this access from completing. The event handler 144 then notifies the file sync application 134 to request 147 the corresponding data object 121 from the file management system 114. The file sync application 134 then downloads the data object 121 for the file system entry 124. During the download of the data object 121, the file sync application 134 can modify the icons of the file system entries 124 as rendered in a user interface 137 to indicate a current download, or to indicate a progress for a current download. The file sync application 134 can also generate a notification for rendering by the client device 104 indicating that the data object 121 is being downloaded. The event handler 144 then allows the access to proceed now that the data object 121 is stored in the client device 104. The file sync application 134 can then release the event handler 144 for the file system entry 124.

The file sync application 134 can determine whether the total size of stored data objects 121 from the file management system 114 including the downloaded data object 121 meets or exceeds the cache size threshold 151. If so, the file sync application 134 selects one or more stored data objects 121 for eviction such that the resulting total size of the data objects 121 meets or falls below the cache size threshold 151. The file sync application 134 can select one or more data objects 121 for eviction based on a frequency of use, recency of use, data size, or other attributes. The file sync application 134 can also apply a caching algorithm or other approach to stored data objects 121 to select data objects 121 for eviction. The file sync application 134 can also select data objects 121 for eviction according to a first-in-first-out (FIFO), last-in-first-out (LIFO), or other ordering approach. In some examples, a trend algorithm can be applied to one or more client devices 104 to determine trending or otherwise relevant data objects 121 that should not be evicted. Additionally, an administrator or other user of the file management system 114 can also designate data objects 121 that will not be evicted. In further examples, a user can be prompted to select which data objects 121 will be evicted, or to select preferences or algorithms for determining what data objects 121 will be evicted.

The file sync application 134 can then delete those data objects 121 selected for eviction from the client device 104. The file sync application 134 can also upload the evicted data objects 121 to the file management system 114 so that changes made to the local instances of the data objects 121 are preserved in the file system 117 of the computing environment 101. Upon deletion of the evicted data objects 121, the file sync application 134 retains their corresponding file system entries 124 and attaches event handlers 144 to the file system entries 124. Thus, subsequent access of these file system entries 124 would initiate a download of the corresponding data objects 121 as was described above.

It is understood that the operations of the file sync application 134 relating to determining data objects 121 for download, selecting data objects 121 for eviction, and other operations can also be performed by the file management system 114, or another application or service executed in the computing environment 101 or client device 104.

Figure 2:
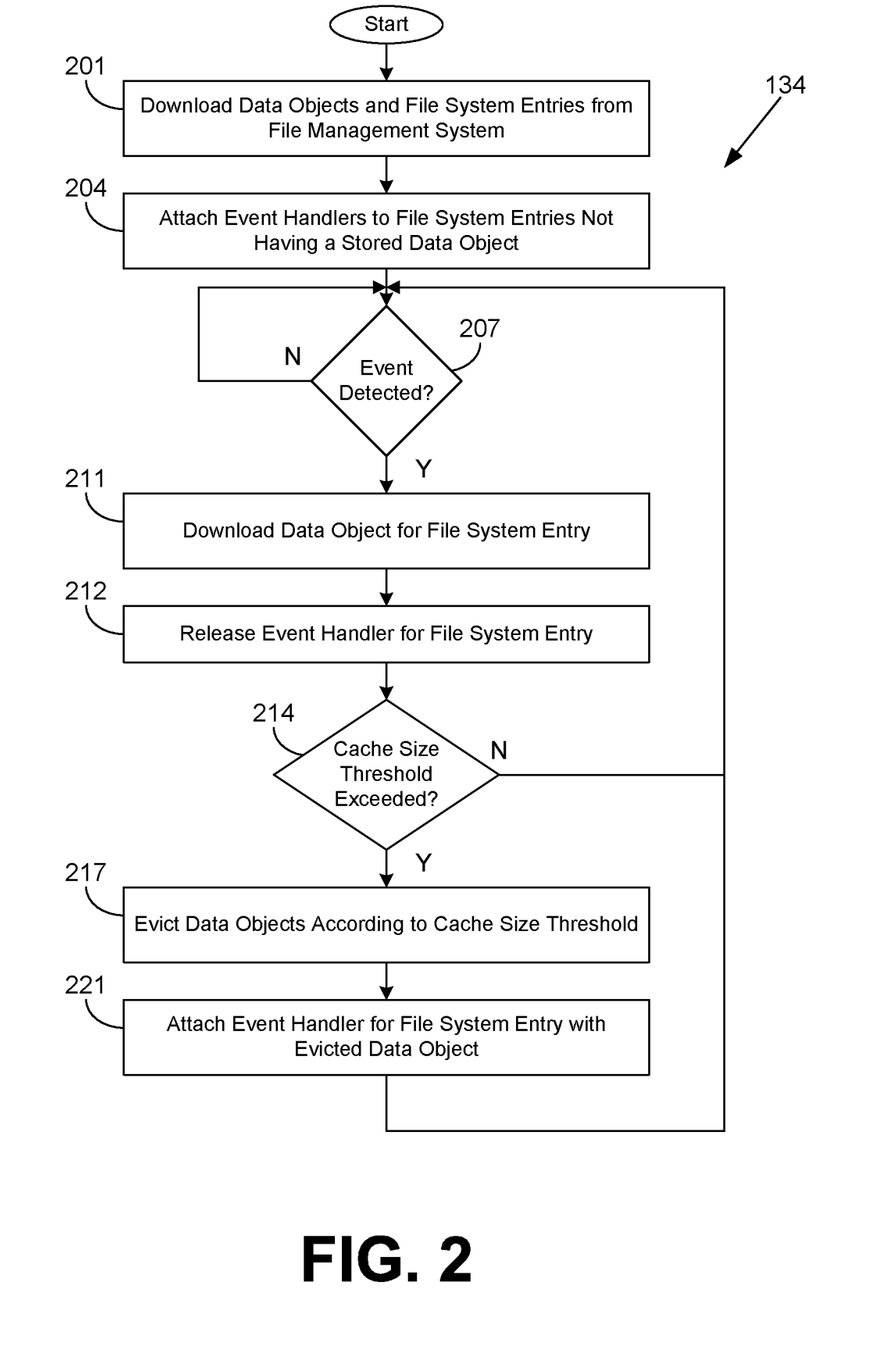
FIG. 2 is a flowchart illustrating an example of functionality implemented as portions of a file sync application.

Referring next to FIG. 2, shown is a flowchart that provides one example of the operation of a portion of the file sync application 134. As an alternative, the flowchart of FIG. 2 can be viewed as depicting an example of elements of a method implemented in the client device 104 according to one or more examples.

Beginning with step 201, the file sync application 134 downloads from a file management system 114 one or more file system entries 124 and/or one or more data objects 121 accessible to the client device 104. The file sync application 134 can determine which data objects 121 should be downloaded by applying one or more rules, one or more caching algorithms, or other approaches as defined in a sync policy 126. For example, the file sync application 134 can rank data objects 121 that can be downloaded according to a frequency of access, a recency of access, or other criteria.

The file sync application 134 then selects according to the ranking a number of data objects 121 such that, after downloading, the total size of data objects 121 associated with the file management system 114 meets or falls below the cache size threshold 151. The data objects 121 can also be selected according to the size of the accessible data objects 121 in order to minimize an amount of free space allocated by the cache size threshold 151. The file sync application 134 then indicates the selected data objects 121 in a request 147. If not stored on the client device 104, the file sync application 134 also downloads the file system entries 124 for the selected data objects 121, as well as the file system entries 124 accessible to the client device 104 for which the data objects 121 are not selected for download.

Next, in box 204, the file sync application 134 attaches an event handler 144 to those file system entries 124 for which a data object 121 is not stored in the data store 141. This event can include issuing an input output control (ioctl) to the file system 117 of the client device 104 indicating a file system entry 124 to which the event handler 144 will be attached.

Then, in box 207 the file sync application 134 waits until an application or service executed in the client device 104 attempts to open or otherwise access a file system entry 124 for which an event handler 144 is attached, thereby generating an event for the event handler 144. The event handler 144 prevents the access from completing, as the data object 121 is not currently stored on the client device 104. The event handler 144 then notifies the file sync application 134 to request 147 the corresponding data object 121 from the file management system 114.

Next, in box 211, the file sync application 134 downloads the data object 121 for the file system entry 124 for which the event was detected. The event handler 144 then allows the access to proceed now that the data object 121 is stored in the client device 104. After downloading the data object 121, in box 212, the file sync application 134 releases the event handler 144 for the corresponding file system entry 124. For example, this issuing a release command or signal to the ioctl attached to the file system entry 124 that corresponds to the newly downloaded data object 121.

The file sync application 134 can determine whether the total size of stored data objects 121 from the file management system 114 meets or exceeds the cache size threshold 151 in box 214. If the cache size threshold 151 is not met or exceeded, the process returns to box 207, where the file sync application 134 waits for another event for an event handler 144. If the cache size threshold 151 is met or exceeded, the process advances to box 217 where the file sync application 134 evicts data objects 121 such that the resulting total size of the data objects 121 meets or falls below the cache size threshold 151. The file sync application 134 can select one or more data objects 121 for eviction based on a frequency of use, recency of use, data size, or other attributes. The file sync application 134 can also apply a caching algorithm or other approach to stored data objects 121 to select data objects 121 for eviction. The file sync application 134 can also select data objects 121 for eviction according to a first-in-first-out (FIFO), last-in-first-out (LIFO), or other ordering approach.

The file sync application 134 can then delete those data objects 121 selected for eviction. The file sync application 134 can also upload the evicted data objects 121 to the file management system 114 so that changes made to the local instances of the data objects 121 are preserved in the file system 117 of the computing environment 101. Upon deletion of the evicted data objects 121 from the client device 104, in box 221, the file sync application 134 retains their corresponding file system entries 124 and attaches event handlers 144 to the file system entries 124. The process then returns to box 207, where the file sync application 134 waits for another event for an event handler 144.

Figure 3A:
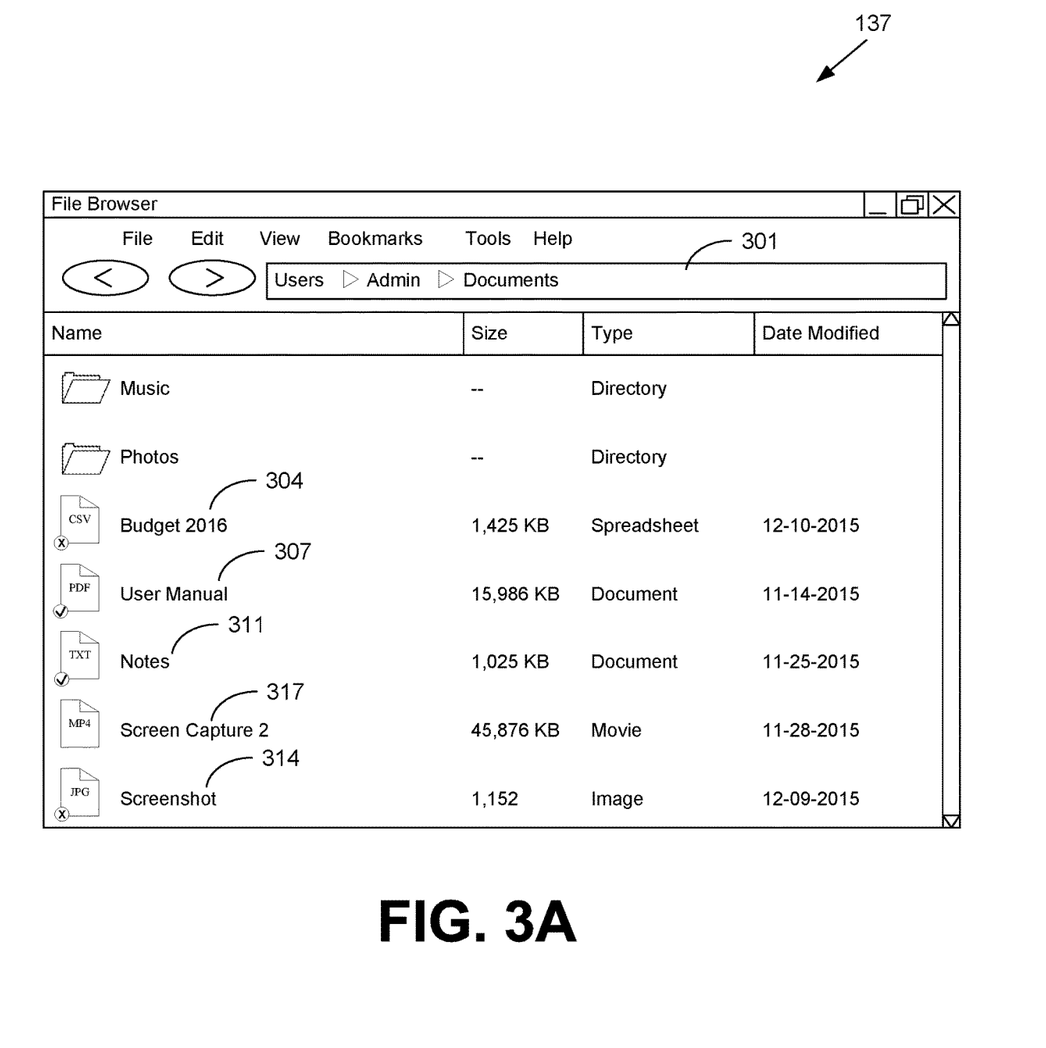
FIGS. 3A and 3B are pictorial diagrams of an example user interface rendered by a client device in the networked environment of FIG. 1 according to various embodiments of the present disclosure.

Moving on to FIG. 3A, shown is a pictorial diagram depicting an example user interface 137 rendered by a client application 131 executed by a client device 104 according to various examples. The client application 131 rendering the user interface 137 is a file browsing client application 131 facilitating a navigation or browsing of a file system 117 of the client device 104. Element 301 indicates a directory browsed by the client application 131. Within the directory are multiple file system entries 124. Particularly, elements 304, 307, 311, and 314 correspond to file system entries 124 synced with the file management system 114. Thus, both the file system 117 of the file management system 114 and the file system 117 of the client device 104 include file system entries 124 corresponding to elements 304, 307, 311, and 314. Element 317 corresponds to a file system entry 124 locally stored on the client device 104 without being synced with the file management system 114. As shown in this example user interface 131, the client application 131 can browse locally stored file system entries 124 seamlessly with other file system entries 124 synced with the file management system 114.

The user interface 131 elements 304, 307, 311, and 314 include an additional graphical component overlaid onto an icon that indicates whether or not a data object 121 is stored in the client device 104 for the corresponding file system entry 124. In this example, elements 304 and 314 include an "X" graphical component, indicating that the data objects 121 corresponding to the "Budget 2016" and "Screenshot" file system entries 124 are not stored in the client device 104. Elements 307 and 311 include a "check" graphical component, indicating that the data objects 121 corresponding to the "User Manual" and "Notes" file system entries 124 are stored in the client device 104. Element 317 lacks this graphical component, as the "Screen Capture 2" file system entry 124 is not synced with the file system 117.

Figure 3B:
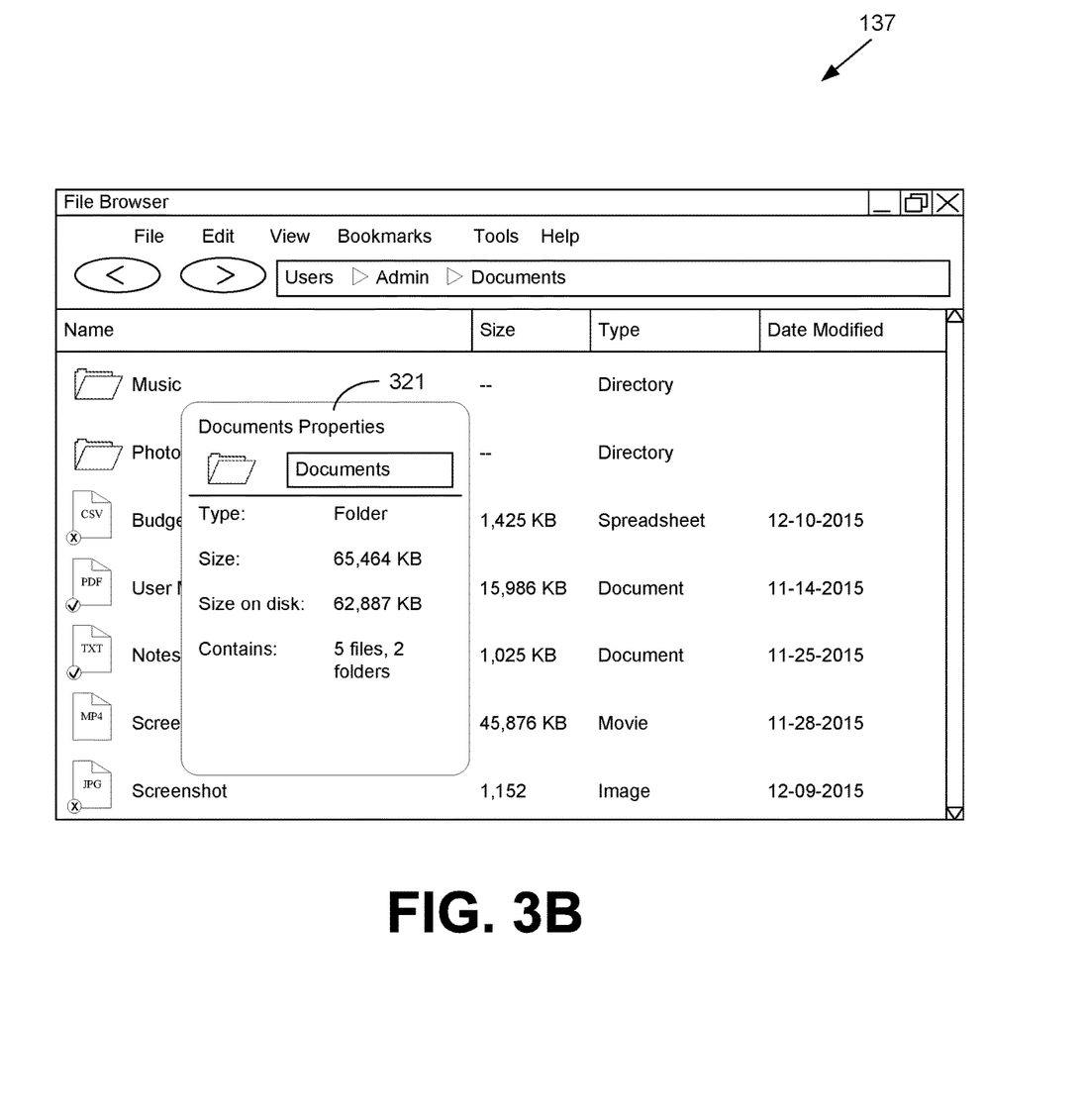

Turning now to FIG. 3B, shown is another pictorial diagram depicting an example user interface 137 rendered by a client application 131 executed by a client device 104 according to various examples. This user interface 137 continues the example set forth above with respect to FIG.

3A, showing a "Properties" user interface 137 element describing various attributes of the "Documents" folder browsed by the client application 131. Of note, the "Size" attribute describes a data size of 65,464 KB, representing the total data size of the data objects 121 corresponding to the depicted file system entries 124. This total data size includes all such data objects 121, regardless of whether the data object 121 is stored in the client device 104. In contrast, the "Size on disk" attribute describes a data size of 62,887 KB, representing the total data size of only those data objects 121 stored on the client device 104. Thus, file system entries 124 synced with the file management system 114 but not having a corresponding data object 121 stored on the client device 104 are excluded from the "Size on disk" attribute.

Although the file management system 114 and file sync application 134, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components.

The flowchart of FIG. 2 shows the functionality and operation of an implementation of portions of the file sync application 134. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart of FIG. 2 show a specific order of execution, it is understood that the order of execution can differ from that which is depicted. For example, the order of execution of two or more blocks can be scrambled relative to the order shown. Also, two or more blocks shown in succession in FIG. 2 can be executed concurrently or with partial concurrence. Further, in some examples, one or more of the blocks shown in FIG. 2 can be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present disclosure.

Also, any logic or application described herein, including the file management system 114 and file sync application 134, that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, magnetic, optical, or semiconductor media. More specific examples of a suitable computer-readable medium would include magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including the file management system 114 and file sync application 134, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 101.

It should be emphasized that the above-described examples of the present disclosure are merely possible examples of implementations set forth for a clear understanding of the principles of the disclosure. Many variations and modifications can be made to the above-described example(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed by the at least one computing device, being configured to cause the at least one computing device to at least:
   download a plurality of file system entries from a remote file management system, the plurality of file system entries including a first file system entry and a second file system entry;
   identify a local file system entry for a locally stored data object in a file system of the at least one computing device, wherein the locally stored data object is not stored with the remote file management system;
   display on a user interface a list of file system entries for the file system in the at least one computing device, wherein the list of file system entries includes the first file system entry, the second file system entry, and the local file system entry, the user interface being configured to visually distinguish the first file system entry and the second file system entry from the local file system entry in the list of file system entries by displaying a first graphical component and a second graphical component based on the locally stored data object not being stored with the remote file management system, the first graphical component being displayed for the first file system entry to indicate that a first data object from the remote file management system is stored in the at least one computing device, the second graphical component being displayed to indicate a second data object associated with the remote file management system is not stored in the at least one computing device;

detect an event associated with an access request for the second file system entry from the list of file system entries in the file system; and download the second data object from the remote file management system in an instance in which the event associated with the access request for the second file system entry has been detected.

2. The non-transitory computer-readable medium of claim 1, wherein the program is further configured to cause the at least one computing device to at least:

delete a particular data object associated with the remote file management system and stored in the file system in an instance in which a total data size of a plurality of data objects and the second data object from the remote file management system exceeds a data size threshold.

3. The non-transitory computer-readable medium of claim 2, wherein the program is further configured to cause the at least one computing device to at least:

attach an event handler to a particular file system entry corresponding to the particular data object deleted from the file system, wherein the particular file system entry represents the particular data object in the file system.

4. The non-transitory computer-readable medium of claim 1, wherein the program is further configured to cause the at least one computing device to at least:

attach a respective event handler to a fourth file system entry, wherein the respective event handler is configured to intercept a request for accessing a fourth data object associated with the fourth file system entry.

5. The non-transitory computer-readable medium of claim 4, wherein attaching the respective event handler further comprises issuing a system call to the file system indicating that the respective event handler is attached to the fourth file system entry.

6. The non-transitory computer-readable medium of claim 1, wherein the program is further configured to cause the at least one computing device to at least:

determine a cache size threshold for downloading a plurality of data objects from the remote file management system.

7. The non-transitory computer-readable medium of claim 1, wherein the program is further configured to cause the at least one computing device to at least:

modify a particular file system entry in the user interface to represent a detected change of a particular data object stored in the file system.

8. A system, comprising:

a computing device comprising a processor and a memory; and the memory comprises machine instructions that, when executed by the processor, cause the processor to at least:

download a plurality of file system entries from a remote file management system, the plurality of file system entries including a first file system entry and a second file system entry;

identify a local file system entry for a local data object in a file system of the computing device, wherein the local data object is not stored with the remote file management system;

display on a user interface a list of file system entries for the file system, wherein the list of file system entries includes the first file system entry and the second file system entry, the user interface being configured to visually distinguish the first file system entry and the second file system entry from the local file system entry by displaying a first graphical component for the first file system entry and a second graphical component for the second file system entry based on the local data object not being stored with the remote file management system, the first graphical component being displayed to indicate that a first data object from the remote file management system is stored in the memory, the second graphical component being displayed to indicate that a second data object from the remote file management system is not stored in the memory;

detect an event associated with an access request for the second file system entry from the list of file system entries in the file system; and download the second data object from the remote file management system in an instance in which the event associated with the access request for the second file system entry has been detected.

9. The system of claim 8, wherein the machine instructions further cause the processor to at least:

delete a particular data object associated with the remote file management system and stored in the file system in an instance in which a total data size of a plurality of data objects and the second data object from the remote file management system exceeds a data size threshold.

10. The system of claim 9, wherein the machine instructions further cause the processor to at least:

attach an event handler to a particular file system entry corresponding to the particular data object deleted from the file system, wherein the particular file system entry represents the particular data object in the file system.

11. The system of claim 8, wherein the machine instructions further cause the processor to at least:

attach a respective event handler to a third file system entry, wherein the respective event handler is configured to intercept a request for accessing a third data object associated with the third file system entry.

12. The system of claim 11, wherein attaching the respective event handler further comprises issuing a system call to the file system indicating that the respective event handler is attached to the third file system entry.

13. The system of claim 8, wherein the machine instructions further cause the processor to at least:

determine a cache size threshold for downloading a plurality of data objects from the remote file management system.

14. The system of claim 8, wherein the machine instructions further cause the processor to at least:

modify the second graphical component for the second file system entry in the user interface to represent the second data object being downloaded from the remote file management system.

15. A method, comprising:

downloading a plurality of file system entries from a remote file management system to a memory of a client device, the plurality of file system entries including a first file system entry and a second file system entry;

identifying a local file system entry for a local data object in a file system of the client device, wherein the local data object is not stored with the remote file management system;

displaying on a user interface a list of file system entries for the file system, wherein the list of file system entries includes the first file system entry and the second file system entry, the user interface being configured to visually distinguish the first file system entry and the second file system entry from the local file system entry by displaying a first graphical component for the first file system entry and a second graphical component for the second file system entry based on the local data object not being stored with the remote file management system, the first graphical component being displayed to indicate that a first data object from the remote file management system is stored in the memory, the second graphical component being displayed to indicate that a second data object from the remote file management system is not stored in the memory;

detecting an event associated with an access request for the second file system entry from the list of file system entries in the file system; and downloading the second data object from the remote file management system in an instance in which the event associated with the access request for the second file system entry has been detected.

16. The method of claim 15, further comprising:

deleting a particular data object associated with the remote file management system and stored in the file system in an instance in which a total data size of a plurality of data objects and the second data object from the remote file management system exceeds a data size threshold.

17. The method of claim 16, further comprising:

attaching an event handler to a particular file system entry corresponding to the particular data object deleted from the file system, wherein the particular file system entry represents the particular data object in the file system.

18. The method of claim 15, further comprising:

attaching a respective event handler to a third file system entry, wherein the respective event handler is configured to intercept a request for accessing a third data object associated with the third file system entry.

19. The method of claim 18, wherein attaching the respective event handler further comprises issuing a system call to the file system indicating that the respective event handler is attached to the third file system entry.

20. The method of claim 18, further comprising:

updating the user interface to display a size attribute of a folder in the client device, the size attribute representing a first total data size of the first data object, the second data object, and a fourth data object, wherein the fourth data object is not stored in the memory of the client device and is stored in the remote file management system; and updating the user interface to display a size on disk attribute for the folder, the size on disk attribute representing a second total data size of the first data object and the second data object.

* * * * *